(12) United States Patent
Solyanik

(10) Patent No.: US 8,150,947 B2
(45) Date of Patent: Apr. 3, 2012

(54) TECHNIQUES FOR PERFORMING OPERATING SYSTEM INSTALLATION ON A HEADLESS DEVICE

(75) Inventor: Sergey Solyanik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

(21) Appl. No.: 11/702,406

(22) Filed: Feb. 5, 2007

(65) Prior Publication Data
US 2008/0189398 A1 Aug. 7, 2008

(51) Int. Cl.
*G06F 15/177* (2006.01)
*G06F 9/445* (2006.01)

(52) U.S. Cl. .................. 709/220; 709/222; 717/174

(58) Field of Classification Search .......... 709/220–222; 713/2; 717/168, 173–174, 178
See application file for complete search history.

(56) References Cited

U.S. PATENT DOCUMENTS

| | | | |
|---|---|---|---|
| 5,953,533 A * | 9/1999 | Fink et al. ............... 717/175 |
| 6,594,757 B1 | 7/2003 | Martinez |
| 6,895,499 B1 | 5/2005 | Frazier |
| 7,120,679 B2 | 10/2006 | Remer |
| 7,237,103 B2 * | 6/2007 | Duncan ............................ 713/1 |
| 2004/0153724 A1 | 8/2004 | Nicholson et al. |
| 2004/0267918 A1 | 12/2004 | Guarraci et al. |
| 2005/0193080 A1 | 9/2005 | Gold et al. |
| 2005/0198233 A1 * | 9/2005 | Manchester et al. .......... 709/221 |
| 2006/0004915 A1 | 1/2006 | Cochran et al. |
| 2006/0010345 A1 * | 1/2006 | Schnoebelen et al. .......... 714/25 |
| 2006/0123015 A1 | 6/2006 | Solyanik et al. |
| 2006/0168575 A1 * | 7/2006 | Bhatt et al. .................... 717/168 |
| 2006/0190238 A1 | 8/2006 | Autor et al. |
| 2006/0224794 A1 | 10/2006 | Stevens |

OTHER PUBLICATIONS

"Building Hardware and Firmware to Complement Microsoft Windows Headless Operation", Date: May 27, 2004, http://download.microsoft.com/download/e/b/a/eba1050f-a31d-436b-9281-92cdfeae4b45/HW-FirmwareforHeadlessWindows-v100a.doc.

"Remote Management of VersaLogic Processor/CPU Boards", http://www.versalogic.com/Support/WhitePaper/ARGON-PXE-VRVL.pdf.

* cited by examiner

Primary Examiner — Peling Shaw

(57) ABSTRACT

Techniques are provided for performing software installation on a headless device. A first device is used to interactively obtain answers in connection with installation processing performed on the first device regarding the software installation for the headless device. The answers are communicated to the headless device. The answers are used in connection with executing installation software on the headless device to perform the software installation on the headless device.

17 Claims, 4 Drawing Sheets

TECHNIQUES FOR PERFORMING OPERATING SYSTEM INSTALLATION ON A HEADLESS DEVICE

BACKGROUND

Software may be installed using existing techniques on a personal computer. Such software may include an operating system installation, a software application installation, or an upgrade for an operating system or other software. Existing techniques for software installation on personal computers utilize an input device, such as a keyboard, and an output display device, such as a monitor, which are attached to the personal computer. A headless device may be characterized as a device with a computer processor but without an attached input device, such as a keyboard, and without the attached display device, such as a monitor. Headless devices may utilize an operating system, software application, and the like. Typically, the operating system and other software that may be used on a headless device are installed on a hard drive of the headless device before the headless device reaches a customer. When the headless device is then used by the customer, the headless device already has the operating system and other software installed thereon. As such, problems exist when the headless device needs to have software installed thereon after the headless device passes to the customer. Existing techniques for software installation utilize input means and output display means, such as a keyboard and monitor, attached to the device upon which the installation is being performed. When a software installation, such as for a new operating system, needs to be performed on the headless device, an entire system image may be copied to a storage area of the headless device. The image may be characterized as a pre-built or pre-constructed image which is copied to the headless device for use.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for performing software installation on a headless device. A first device is used to interactively obtain answers in connection with installation processing performed on the first device regarding the software installation for the headless device. The answers are communicated to the headless device. The answers are used in connection with executing installation software on the headless device to perform the software installation on the headless device. Audio feedback regarding the installation processing on the headless device may be provided using components of the headless device.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
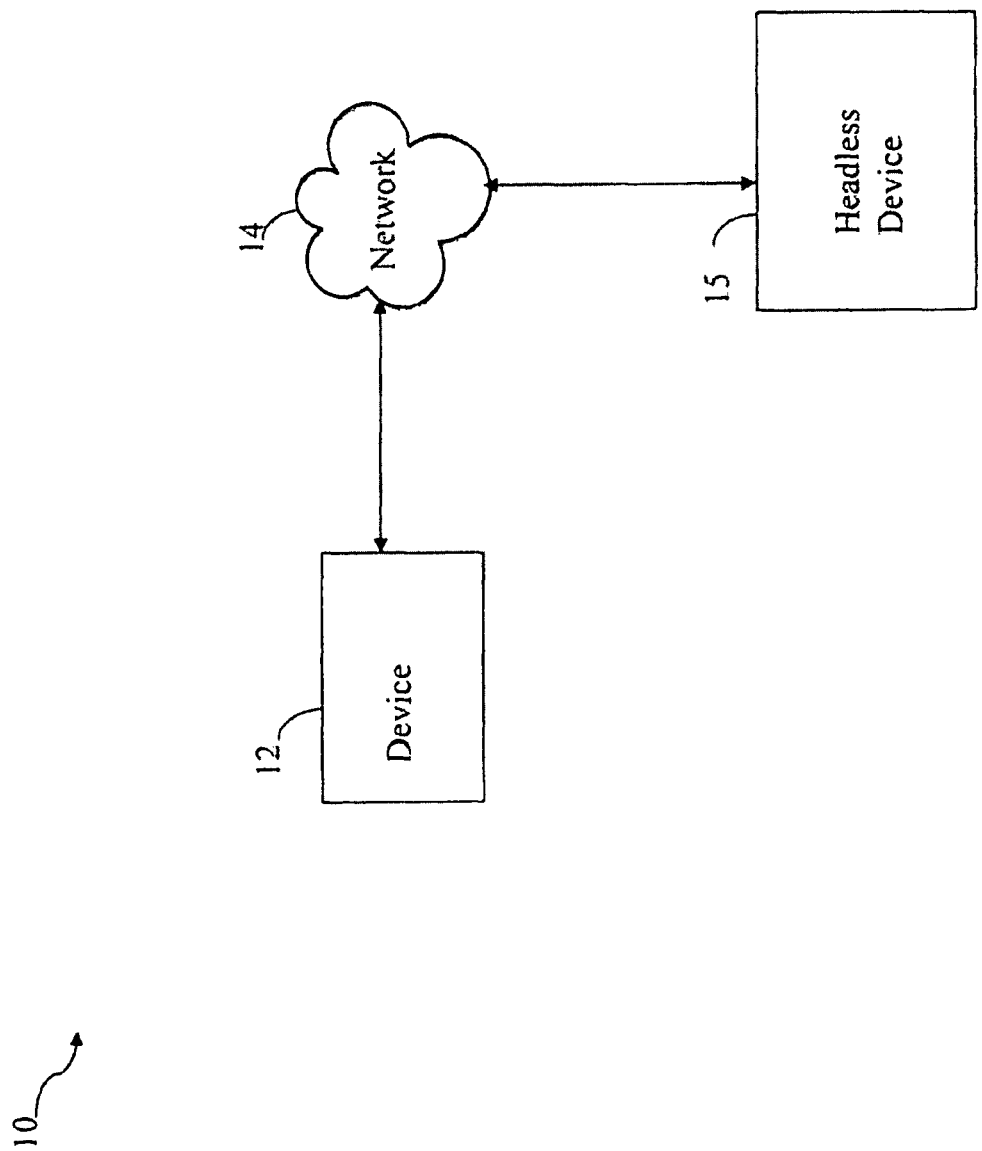
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with performing software installation on a "headless" device. As will be described in more detail herein, a device may be characterized as "headless" if the device does not have an attached output display device, such as a monitor, and the device also does not have a keyboard, mouse, or other attached input device. Headless devices include, for example, a gateway, router, printer, server, and the like. Techniques are described herein that may be used in connection with installation of software, such as an operating system, on such headless devices. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a device 12, a network 14, and a headless device 15. The device 12 may be, for example, a computer, such as a personal or desk top computer, having a display output device and an input device providing for interactive I/O with a user thereof. The device 12 included in FIG. 1 is exemplary for purposes of illustrating the techniques described herein in connection with installation of software on a headless device 15. In one embodiment, any device 12 having input and output devices connected thereto capable of having software, such as an operating system, installed thereon, and providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the headless device 15 and other computers not shown in FIG. 1. As described herein, the device 12 may be a personal computer. In other embodiments, the functionality of device 12, or the device 12 itself, may be included in another component in accordance with a particular environment in which the device 12 is utilized. The techniques herein utilize the interactive functionality provided by the input and output devices attached to the personal computer or other device 12 in connection with installation of software on the headless device 15.

The headless device 15 may communicate with device 12 when connected to the network 14. The headless device 15 may be a device with a processor upon which software, such as an operating system, may be installed. The headless device 15 may be, for example, a router, gateway, printer, server, or other such device without an input device, such as a keyboard or mouse, and without an output display device, such as a monitor.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the headless device 15.

It should also be noted that although the device 12 is illustrated as having connectivity to the headless device 15, the techniques described herein may be used in connection with a device 12 directly connected to the headless device 15 without a network or other external connection to the headless device 15. The techniques described herein may also be used in an embodiment in which devices 12 and 15 have no connectivity with each other. In such an embodiment, information to be communicated between the devices 12 and 15 may be transferred using a portable storage device or medium, such as a USB device, and the like. These and other variations are described in more detail in following paragraphs.

As will also be appreciated by those skilled in the art, the techniques herein may be used in connection with installing any one or more different types of software on a headless device. The techniques described herein may be used to install software on a headless device such as, for example, a new operating system installation, an operating system reinstallation, an operating system upgrade or update, an application installation, an application upgrade or update, and the like.

Figure 2:
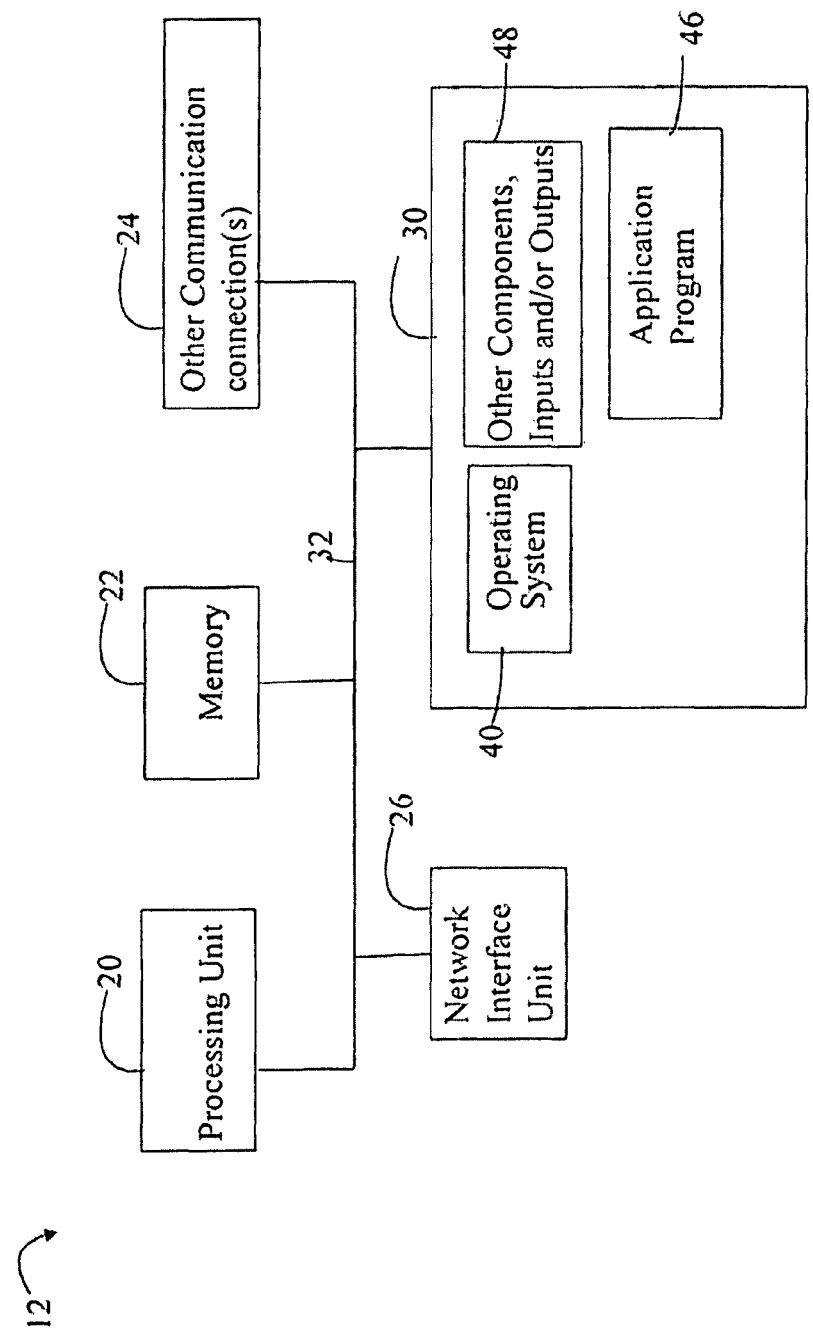
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, and other components, inputs, and/or outputs 48. In one embodiment, the application program 46 may be a web browser, a client-side application, or other application used when operating the device 12 standalone and/or with external connectivity.

The operating system 40 may be any one of a variety of commercially available or proprietary operating systems. The operating system 40, for example, may be loaded into memory in connection with controlling operation of the user computer. One or more application programs 46 may execute in the device 12 in connection with performing user tasks and operations.

It should be noted that the headless device 15 may include components similar to those described and illustrated in connection with the device 12 of FIG. 2 depending on the particular headless device. One distinction between the device 12 and the headless device 15 is that the headless device 15 does not include components attached thereto typically used in connection with user interaction and feedback. For example, the headless device 15 does not include connected thereto, for example, a monitor, keyboard, or mouse.

In connection with the techniques herein, installation of software on the headless device 15 may be performed using device 12, such as a personal computer with a keyboard and monitor attached thereto, for information collection as part of the installation setup process. Subsequently, after the information is collected, the collected information may be used on the headless device to install the software thereon. Progress and feedback regarding the installation on the headless device may be provided using audio feedback, for example, using speakers included on the headless device 15. In one embodiment, the headless device 15 includes components necessary to provide such auditory feedback to a user performing the installation on the headless device 15.

What will now be described is an exemplary embodiment using the techniques herein to install an operating system on the headless device 15 although the techniques may be used to install other software on the headless device 15. Additionally, the device 12 in the following example is a computer having an attached keyboard and monitor but may be any other device including a processor and capable of interactive I/O functionality as described herein.

In one embodiment, the installation may be performed using an installation CD for the operating system or other software to be installed on the headless device 15. As a first step, the installation CD is inserted into device 12 to begin execution of a setup program. In one embodiment, the setup program is run as part of the installation process to obtain answers in connection with the installation process, copy necessary files from the installation CD, and other processing steps in connection with the installation. The answers may relate to, for example, user accounts, installation configuration options, and the like, as may normally be obtained as part of an interactive dialogue with a user during the installation process.

The setup program may prompt the user to specify a storage device, such as a USB device, and provide any associated media for storage. The setup program proceeds to obtain answers to installation questions as prompted. The answers provided relate to the installation for the headless device 15 although the setup program is executing on the device 12 and also using the interactive capabilities of the device 12 to obtain the answers. The questions and answers may be those typically included in an installation setup dialogue. The answers may be recorded and stored on the storage device. In one embodiment, the answers may be stored in a template or answer file. The answer file may be stored in a known location on the storage device, for example, a predetermined directory or folder in a named file. The answers may then be transferred to the headless device 15.

The answer file, or more specifically the answers included therein, may be transferred to the headless device using any one of a variety of techniques. In one embodiment, the answers may be included in an answer file which is physically ported or copied to the storage device, such as a USB device, on the computer. Subsequently, the storage device may be physically removed from the computer and inserted into the headless device where the answers are used in subsequent processing on the headless device. The foregoing may be used, for example, in an embodiment in which there is no connectivity between the headless device and the computer upon which the answers are obtained.

In another embodiment, the answer file may be stored locally on the computer and then transferred to the headless device over a network or other connection. In one variation, the computer executing the setup program may obtain the answers interactively, connect to the headless device over a network and then send the answers to the headless device via the network connection. The foregoing may be performed during the installation setup dialogue on the computer. The answers may be collected and transmitted to the headless device as obtained interactively from a user on the computer using interactive means. In another variation, the answers may be batched or collected and stored in an answer file which is transmitted at a later point by the computer to the headless device. The answer file may be transmitted to the headless device over a network connection in which the transmission of answers is controlled and initiated by the computer. Alternatively, the computer may store all the answers locally in an answer file. At a later point in time when performing the installation setup process on the headless device, the headless device may connect to the computer and obtain the answers over a network connection. In this latter example, the headless device may initiate the process to obtain and copy the answers from the answer file.

These and other techniques may be used in connection with communicating the answers from the computer or other interactive device to the headless device.

As mentioned above, after the answers are obtained using the computer or other device 12 and its interactive capabilities, the answers are communicated to the headless device. In one embodiment the answers obtained using the computer are recorded and stored on a storage device. The headless device is then rebooted using an installation CD with the setup program. The setup program executes on the headless device and the storage device having the answer file stored thereon is then inserted into the headless device. The setup program examines the storage device to determine if the storage device has the answer file stored thereon in the predetermined location. If the answer file is located, the setup program proceeds to execute on the headless device using the answers contained in the answer file. In this instance, the answers are used in place of interactively obtaining the answers during the setup program execution on the headless device. If the answer file is not located, the setup program may enter a listening mode and listen for answers to be sent from the computer over a network or other connection.

Using any of the techniques described herein as well as others that will be appreciated by those skilled in the art, the setup program on the headless device obtains the recorded answers from the computer or other device 12. Subsequently, the setup program executing on the headless device performs hardware examination processing in which the headless device is scanned for hardware needed by the operating system or other software for which the installation is being performed. The setup program populates the data fields in the answer file with the details of the hardware present on the headless device. The setup program may then use a voice interface through built in speakers on the headless device to prompt the user to remove the storage device containing the updated answer file and any other installation media, and to proceed to insert the installation CD and storage media back into the computer or other device 12.

The setup program is then executed again on the computer or other device 12. Using the updated answer file, the setup program evaluates whether the headless device meets minimum configuration requirements for the installation. Additionally, for the particular hardware on the headless device, the setup program may obtain any new or updated device drivers which are not included on the installation CD. As known in the art, the installation CD or other installation media may include a set of device drivers thereon. However, it may be that additional device drivers or more up to date drivers are available. For example, if there are particular network drivers or more up to date network drivers needed for successful installation on the headless device, the setup program detects all such drivers which are needed and which are not currently included on the installation CD. The setup program may download these drivers automatically, such as over a network connection from a website, or may use other means to collect the necessary drivers. For example, the setup program may copy these drivers to the storage device containing the answer file. The drivers may be located in a separate predetermined directory or file and may include individual subdirectories for each of the different device drivers. Once the setup program collects the drivers or any other additional information needed for a successful installation on the headless device, the user is prompted to remove the installation CD and storage device from the computer. The user then proceeds to reboot the headless device using the installation CD and inserts into the headless device the storage media including the answer file and any additional information, such as the drivers. The setup program and installation process on the headless device continues.

It should be noted that the updated answer file and additional information, such as the drivers, collected on the computer may be communicated to the headless device using the storage device or any one or more other techniques as described herein and known to those skilled in the art.

As the installation process continues, the progress may be reported to the user with audio feedback. For example, speakers included in the headless device may be used to provide synthesized voice feedback to the user. The foregoing may be used a means to provide installation progress feedback to the user instead of displaying information on a monitor.

The setup program and other installation software may maintain a log of the installation process. In one embodiment this log may be stored on the same storage device that contains the answer file. If an error occurs, the audio feedback may alert the user to the error so that the user may examine the log on the storage device in connection with identifying and/or troubleshooting the error.

If the installation on the headless device completes successfully, the audio feedback may accordingly alert the user. Additionally, in one embodiment in which the headless device is included as part of a network, the audio feedback may announce the IP address of the headless device.

In one embodiment, the storage device used to collect answers and other information for use by the headless device may a USB device although other storage devices may be used in connection with the techniques herein.

It should be noted that in connection with the techniques herein, the headless device 15 may have its BIOS configured to ignore errors, such as the absence of a monitor and keyboard, in order to allow the installation and boot processing described herein to be performed. The appropriate BIOS settings may be configured, for example, by the manufacturer upon user request.

It should be noted that one or two installation CDs or other installation media may be used in connection with the techniques herein. In one embodiment, a first installation CD may be used in connection with the processing described herein for the device 12 and a second different installation CD may be used in connection with the processing described herein for the headless device 15. Alternatively, an embodiment may utilize a single installation CD or other media in connection with both the device 12 and the headless device 15.

Figure 3:
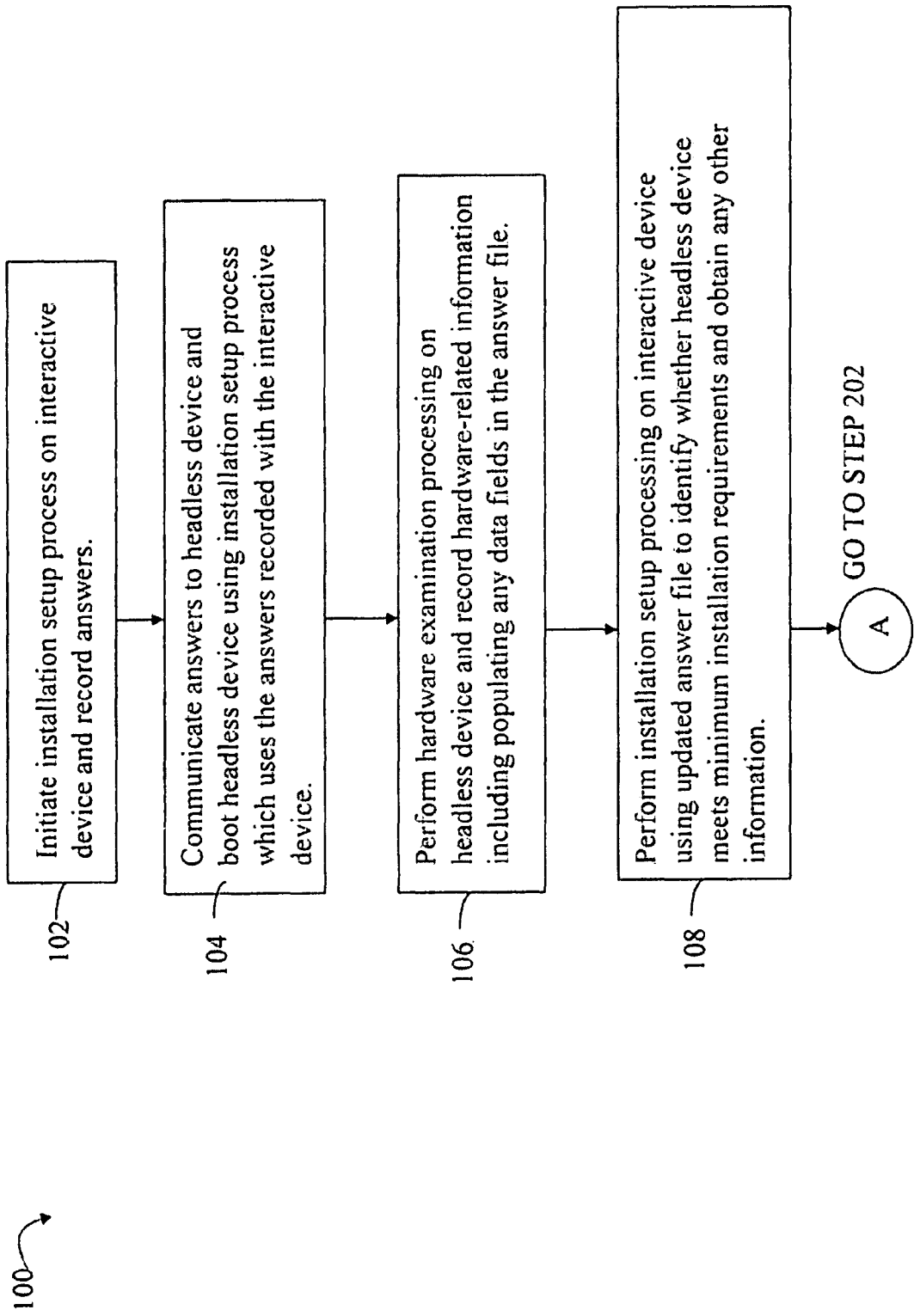
FIGS. 3 and 4 are flowcharts illustrating processing steps that may be performed in an embodiment utilizing the techniques herein for software installation on a headless device.
Figure 4:
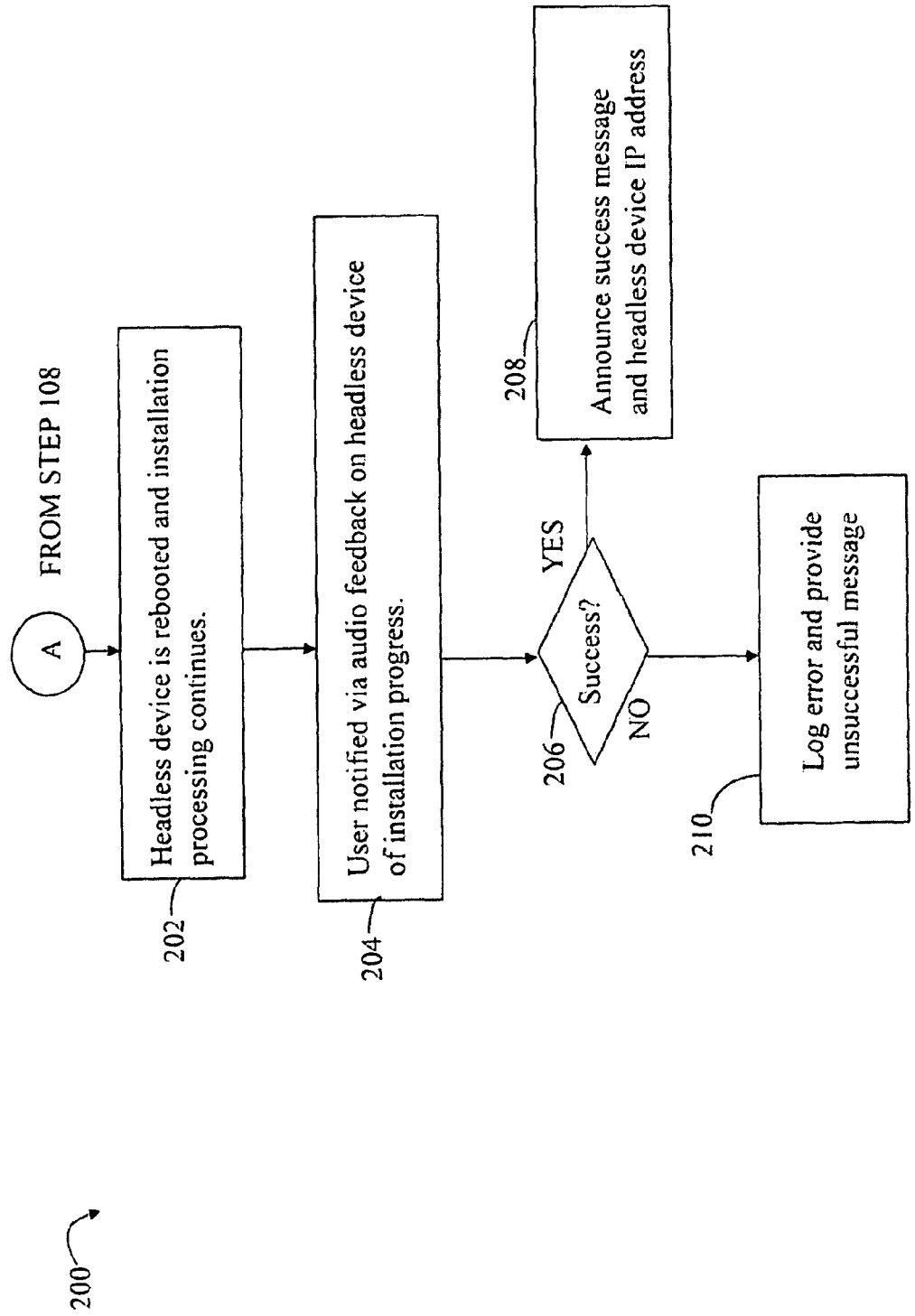

Referring now to FIGS. 3 and 4, shown is a flowchart of processing steps that may be performed in an embodiment utilizing the techniques herein. The steps of the flowchart summarize processing described above. In the processing steps described in connection with FIGS. 3 and 4, the computer or other device 12 providing interactive I/O through a keyboard or mouse and monitor attached thereto may be referred to as a non-headless device or an interactive device. At step 102, the installation setup process is initiated and performed on the interactive device. Answers obtained as part of this process are recorded, for example, in an answer file. At step 104, the answers are communicated to the headless device. The headless device is then booted and the installation setup process is executed thereon using the answers obtained with the interactive device from step 102. At step 106, hardware examination processing is performed on the headless device. Hardware-related information as pertaining to the headless device is recorded, for example, and used in populating particular data fields of the answer file. At step 108, installation setup processing is performed on the interactive device using the updated answer file to identify whether the headless device meets minimum installation requirements and to also obtain any other information, such as updated drivers. At step 202, the headless device is rebooted using the updated answer file and any other information, such as the updated device drivers, obtained in step 108. At step 204, the user may be notified via audio feedback on the headless device of the installation progress. It should be noted that the user may be notified at various points in the installation as to the related progress. If at any time an error occurs, the user may be notified using the audio feedback so that the user can take appropriate action, such as, for example, examining the log file. At step 206, a determination is made as to whether the installation has completed successfully. If so, control proceeds to step 208 where a successful installation message may be made using the speakers of the headless device. Additionally, the IP address of the headless device may be announced. If step 206 evaluates to no, control proceeds to step 210 to log any errors and provide an unsuccessful completion message using audio feedback such as using the speakers of the headless device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing software installation on a headless device comprising:
   using a first device to interactively obtain answers in connection with installation processing performed on the first device regarding the software installation for the headless device;
   recording the answers on a storage device of the first device;
   communicating the answers to the headless device by connecting the storage device to the headless device making the answers available to the headless device during the software installation on the headless device;

subsequent to communicating the answers, performing hardware examination processing on the headless device;

recording hardware-related information obtained during the hardware examination processing on the headless device on the storage device;

performing processing on the first device to determine whether the headless device meets minimum installation requirements and whether additional information is needed for the software installation on the headless device;

subsequent to performing the hardware examination processing, updating the answers based upon obtained hardware-related information; and using the updated answers in connection with executing installation software on the headless device to perform the software installation on the headless device.

2. The method of claim 1, wherein the software installation is to perform installation of an operating system.

3. The method of claim 1, wherein the software installation is to perform installation of an application.

4. The method of claim 1, wherein the software installation is to perform installation of a software upgrade.

5. The method of claim 1, wherein the headless device is a router.

6. The method of claim 1, wherein the headless device is a gateway.

7. The method of claim 1, wherein the headless device is a printer.

8. The method of claim 1, wherein the headless device is a server.

9. The method of claim 1, wherein there is no connectivity between the headless device and the first device.

10. The method of claim 1, wherein the additional information includes device drivers and the additional information is obtained using the first device and copied to the storage device for use by the headless device.

11. The method of claim 1, further comprising:

recording installation progress in a log file on the storage device when performing processing on the headless device.

12. The method of claim 1, further comprising:

providing audio feedback regarding the software installation on the headless device using components of the headless device.

13. The method of claim 12, further comprising:

providing a success message and address of the headless device as audio feedback if the software installation completes successfully, and otherwise providing an unsuccessful message.

14. The method of claim 1, wherein the first device and headless device have connectivity over a connection and the method comprising:

communicating the answers to the headless device over the connection.

15. A method for performing software installation on a headless device comprising:

using a first device to interactively obtain answers in connection with the software installation on the headless device;

recording the answers information regarding the software installation on a storage device on the first device;

connecting the storage device to the headless device;

performing hardware examination processing on the headless device using the recorded answers;

storing, on the storage device, updated answers including hardware-related information obtained from said hardware examination processing on the headless device;

performing processing on the first device using the updated answers to determine whether the headless device meets minimum installation requirements and whether additional information is needed for the software installation on the headless device;

using the updated answers in connection with the software installation on the headless device; and providing audio feedback during processing for the software installation on the headless device using components of the headless device.

16. A computer readable medium comprising code stored thereon for performing software installation on a headless device, the computer readable medium comprising code for:

recording answers interactively using input and output means of a first device for use in connection with the software installation on the headless device;

communicating the answers to the headless device;

subsequent to communicating the answers, performing hardware examination processing on the headless device using the answers;

storing updated answers including hardware-related information obtained from said hardware examination processing on the headless device;

using the updated answers in connection with the software installation on the headless device; and providing audio feedback during processing for the software installation on the headless device regarding the software installation using components of the headless device.

17. The computer readable medium of claim 16, wherein the first device does not have connectivity to the headless device.

* * * * *